(12) United States Patent
Koch et al.

(10) Patent No.: US 11,498,158 B2
(45) Date of Patent: Nov. 15, 2022

(54) ADDITIVE MANUFACTURING METHOD

(71) Applicant: Ford Global Technologies, LLC, Dearborn, MI (US)

(72) Inventors: Raphael Koch, Northrhine-Westphalia (DE); Lars Bognar, Dormagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 912 days.

(21) Appl. No.: 16/356,124

(22) Filed: Mar. 18, 2019

(65) Prior Publication Data

US 2019/0283183 A1    Sep. 19, 2019

(30) Foreign Application Priority Data

Mar. 19, 2018    (DE) .......................... 102018204143.1

(51) Int. Cl.

| | |
|---|---|
| *B23K 26/34* | (2014.01) |
| *B33Y 10/00* | (2015.01) |
| *B33Y 30/00* | (2015.01) |
| *B33Y 50/00* | (2015.01) |
| *B23K 26/342* | (2014.01) |
| *B33Y 40/00* | (2020.01) |
| *B23K 26/146* | (2014.01) |
| *B23K 26/03* | (2006.01) |
| *B23K 26/12* | (2014.01) |
| *B23K 26/08* | (2014.01) |

(52) U.S. Cl.
CPC ............ *B23K 26/342* (2015.10); *B23K 26/03* (2013.01); *B23K 26/0861* (2013.01); *B23K 26/123* (2013.01); *B23K 26/146* (2015.10); *B33Y 10/00* (2014.12); *B33Y 30/00* (2014.12); *B33Y 40/00* (2014.12); *B33Y 50/00* (2014.12)

(58) Field of Classification Search
CPC ......... B33Y 10/00; B33Y 30/00; B33Y 50/00; B23K 26/34–342
See application file for complete search history.

(56) References Cited

U.S. PATENT DOCUMENTS

| | | | |
|---|---|---|---|
| 6,363,606 B1 | 4/2002 | Johnson et al. | |
| 10,118,343 B1* | 11/2018 | Linnell | ................. B29C 64/245 |
| 10,391,712 B2* | 8/2019 | Hoover | .................. B33Y 99/00 |
| 2014/0070461 A1* | 3/2014 | Pax | ....................... B29C 64/106 |
| | | | 425/375 |
| 2016/0243759 A1 | 8/2016 | Snyder et al. | |
| 2018/0141174 A1* | 5/2018 | Mori | .................... B23K 26/342 |

(Continued)

FOREIGN PATENT DOCUMENTS

| | | |
|---|---|---|
| CN | 205033598 U | 2/2016 |
| DE | 202015103932 U1 | 9/2015 |

(Continued)

*Primary Examiner* — Michael A Laflame, Jr.
(74) *Attorney, Agent, or Firm* — Raymond L. Coppiellie; Burgess Law Office, PLLC

(57) ABSTRACT

An additive manufacturing method wherein an object is manufactured by powder being applied layer-by-layer by an application device onto a base along a buildup surface and being bonded in regions to form a matrix. To provide an efficient additive powder bed method, a position of the base is checked by at least one measurement with a sensor device and the position of the base is automatically corrected at least in relation to the application device based on the at least one measurement.

20 Claims, 8 Drawing Sheets

(56) References Cited

U.S. PATENT DOCUMENTS

| | | | | |
|---|---|---|---|---|
| 2019/0201979 A1* | 7/2019 | Huang | ................. | B23K 26/032 |
| 2020/0023575 A1* | 1/2020 | Maccagnan | ........... | B29C 64/118 |
| 2020/0324356 A1* | 10/2020 | Yamasaki | ............... | B22F 12/90 |
| 2021/0229836 A1* | 7/2021 | Sharples | ................. | B64C 1/061 |

FOREIGN PATENT DOCUMENTS

| | | |
|---|---|---|
| DE | 102014213888 A1 | 1/2016 |
| DE | 112016001314 T5 | 12/2017 |
| WO | WO2016088048 | 6/2016 |
| WO | WO2016088049 | 6/2016 |

\* cited by examiner

ADDITIVE MANUFACTURING METHOD

CROSS-REFERENCE TO RELATED APPLICATIONS

Not Applicable.

BACKGROUND OF THE INVENTION

1. Field of the Invention

The present invention relates generally to a method for manufacturing; and more specifically to an additive manufacturing method.

2. Description of Related Art

Various methods exist by which three-dimensional models can be produced from shapeless or shape-neutral material such as powders, possibly with the addition of a binder, or liquids, which also includes temporarily molten solids, based on construction data. These methods are also known under collective terms such as "Rapid Prototyping," "Rapid Manufacturing," or "Rapid Tooling." In this case, a forming step often takes place, in which the starting material is provided in liquid form from the outset or is liquefied and cures at the provided point. One known method is called fused filament fabrication (FFF), in which a workpiece is constructed layer-by-layer from thermoplastic. The plastic is supplied, for example, in the form of a powder or strand melted, and applied in molten form by a printhead, which successively applies individual, generally horizontal layers of the object to be produced.

Methods are known in which a powdered material, for example, a plastic, is applied layer-by-layer and is selectively cured using a locally applied or printed-on binder. Other methods, for example, selective laser sintering (SLS), include applying a powder layer-by-layer, for example with the aid of a squeegee, onto a construction platform. The powder is selectively heated with suitable focused radiation, for example, a laser beam, and thus sintered. After the buildup of one layer, the construction platform is slightly lowered, and a new layer is applied. Plastics, ceramics, or metals can be used as the powder for this purpose.

Numerous manual work steps still have to be executed in additive manufacturing methods, in particular in powder bed methods such as SLS. For example, the alignment of the construction platform has to be manually measured and corrected for the successful formation of the powder bed. If separately manufactured parts are to be integrated into the corresponding component, the additive manufacturing process must be interrupted to insert the corresponding component parts, which also takes place manually. These manual procedures not only lengthen the process time, but also subject the manufacturing region to the ambient air, which, depending on the powder used, could cause its oxidation, or possibly even combustion or explosion.

SUMMARY OF THE INVENTION

An additive manufacturing method, wherein an object is manufactured by powder being applied layer-by-layer by an application device onto a base along a buildup surface and being bonded in regions to form a matrix including checking a position of the base by at least one measurement using a sensor device and automatically correcting the position of the base at least in relation to the application device depending on the at least one measurement. The sensor device is arranged on a robot articulated arm that moves the sensor device into a measuring position for the respective measurement wherein the robot articulated arm, and corresponding the sensor device, is separate from and operates independently of the application device.

Further areas of applicability of the present invention will become apparent from the detailed description provided. It should be understood the detailed description and specific examples, while indicating an exemplary or preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. In the different figures, identical parts are always provided with the same reference signs, because of which they are generally also only described once.

Figure 2:
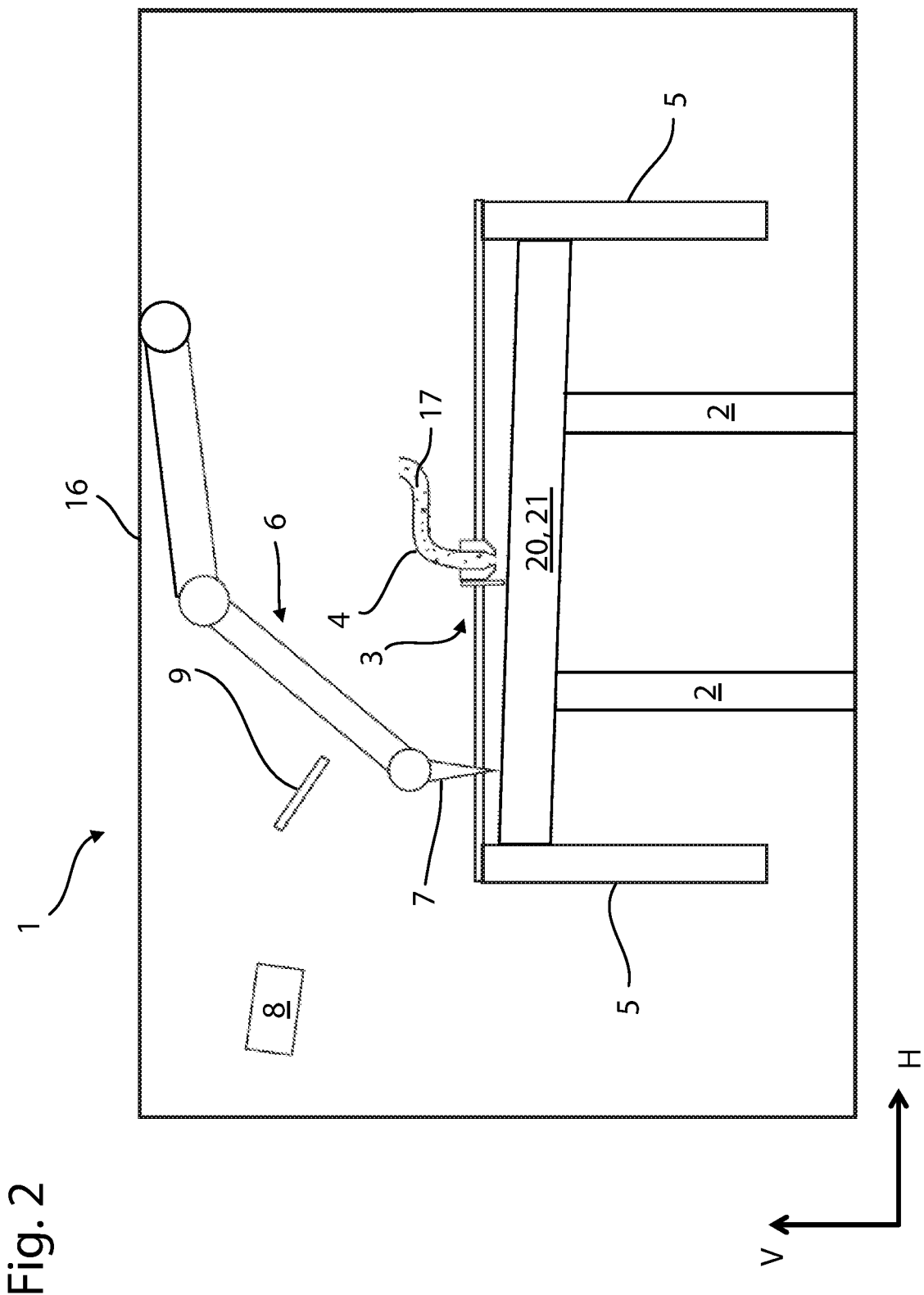
FIG. 2 is a schematic side view of the additive manufacturing system of FIG. 1 with the sensor device measuring the construction platform at a second position.
Figure 3:
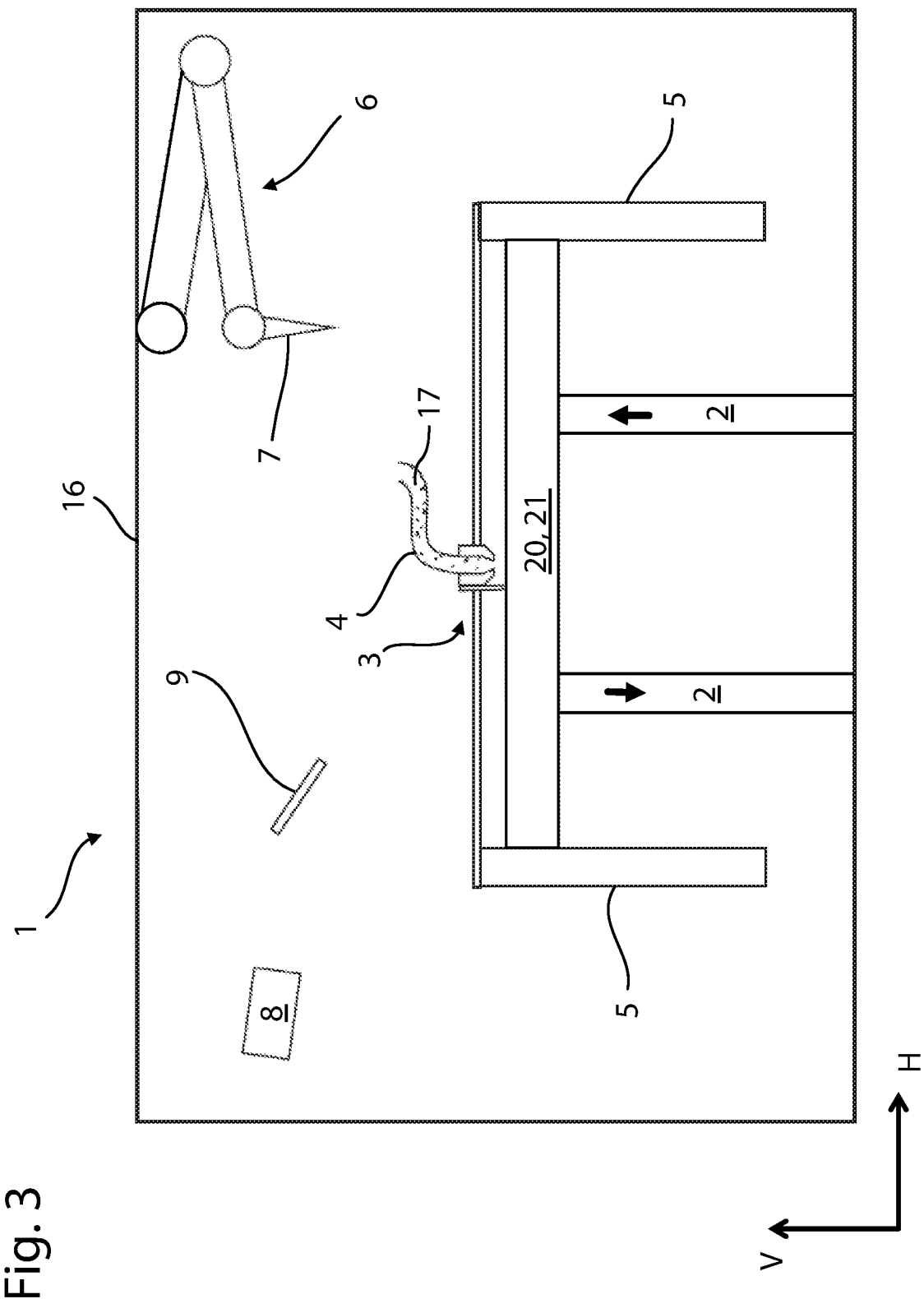
FIG. 3 is a schematic side view of the embodiment of FIG. 1 with the robot arm and sensor device in a readiness position.
Figure 4:
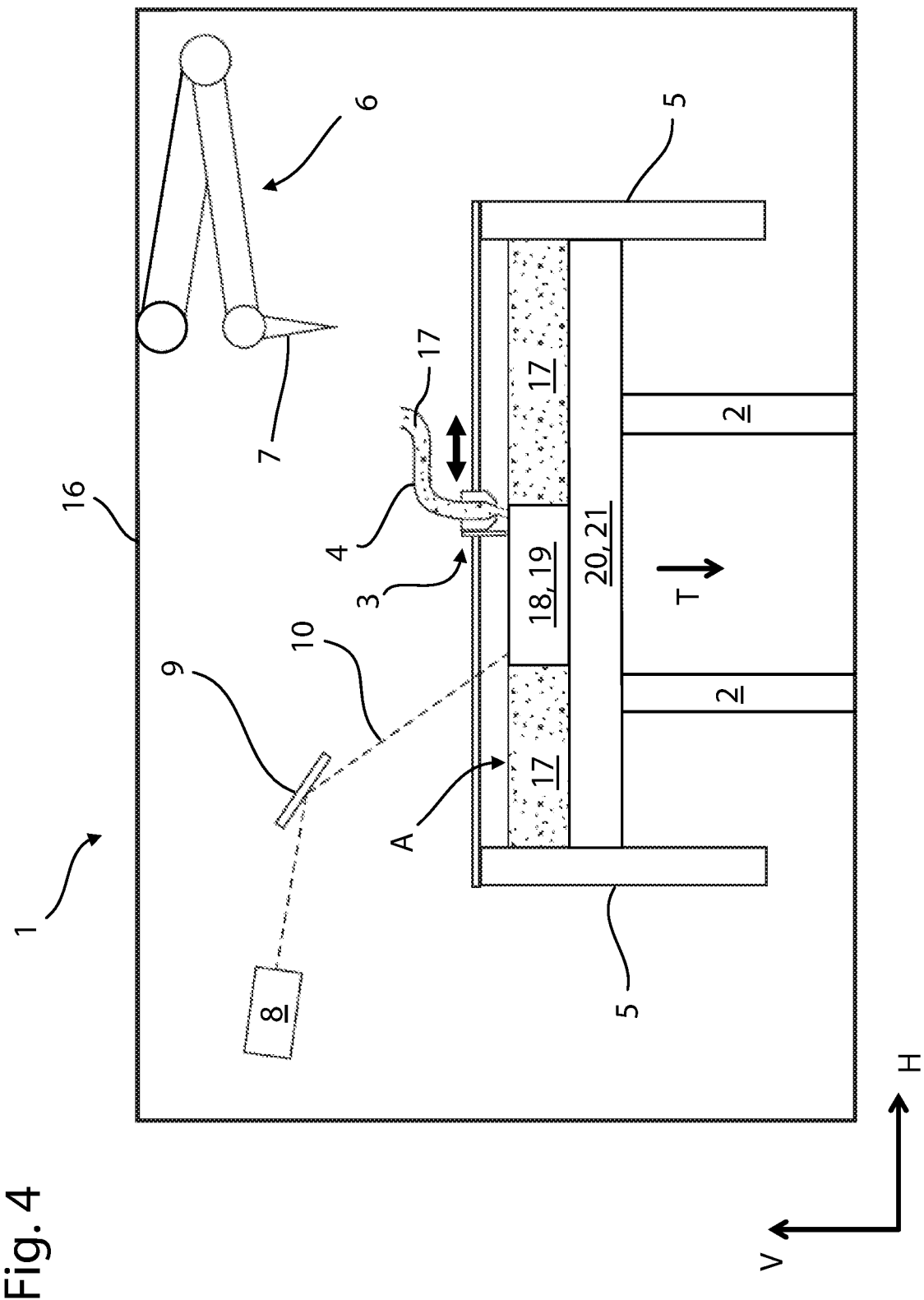
FIG. 4 is a schematic side view of the embodiment of FIG. 1 forming a layer of an object.

FIGS. 1-8 show multiple embodiments of an additive manufacturing system and method, seen generally at 1. The system 1 including a construction platform 21, producing an object 19 by additive manufacturing. The construction platform 21 supported on vertically adjustable supports 2. As shown in FIG. 4, metallic powder 17 is applied layer-by-layer along a horizontal buildup surface A on the construction platform 21 by a first application device 3. The first application device 3 can have a type of nozzle or valve for powder dispensing and also a smoothing device, for example, a squeegee. As illustrated by the double arrow, the first application device 3 moves parallel to the buildup surface A, to distribute powder 17 along the entire buildup surface A. Side walls 5 adjoin the construction platform 21 on both sides, which prevent lateral trickling off of powder 17. A housing 16, filled with inert gas and into which inert gas is injected continuously, whereby the oxygen content is kept low to prevent oxidation or even explosion of the powder 17, encloses the system 1. The housing 16 filled with inert gas has inert gas injected continuously, whereby the oxygen content is kept low. The laser 8 and the energy source need not be inside the housing 16.

Figure 1:
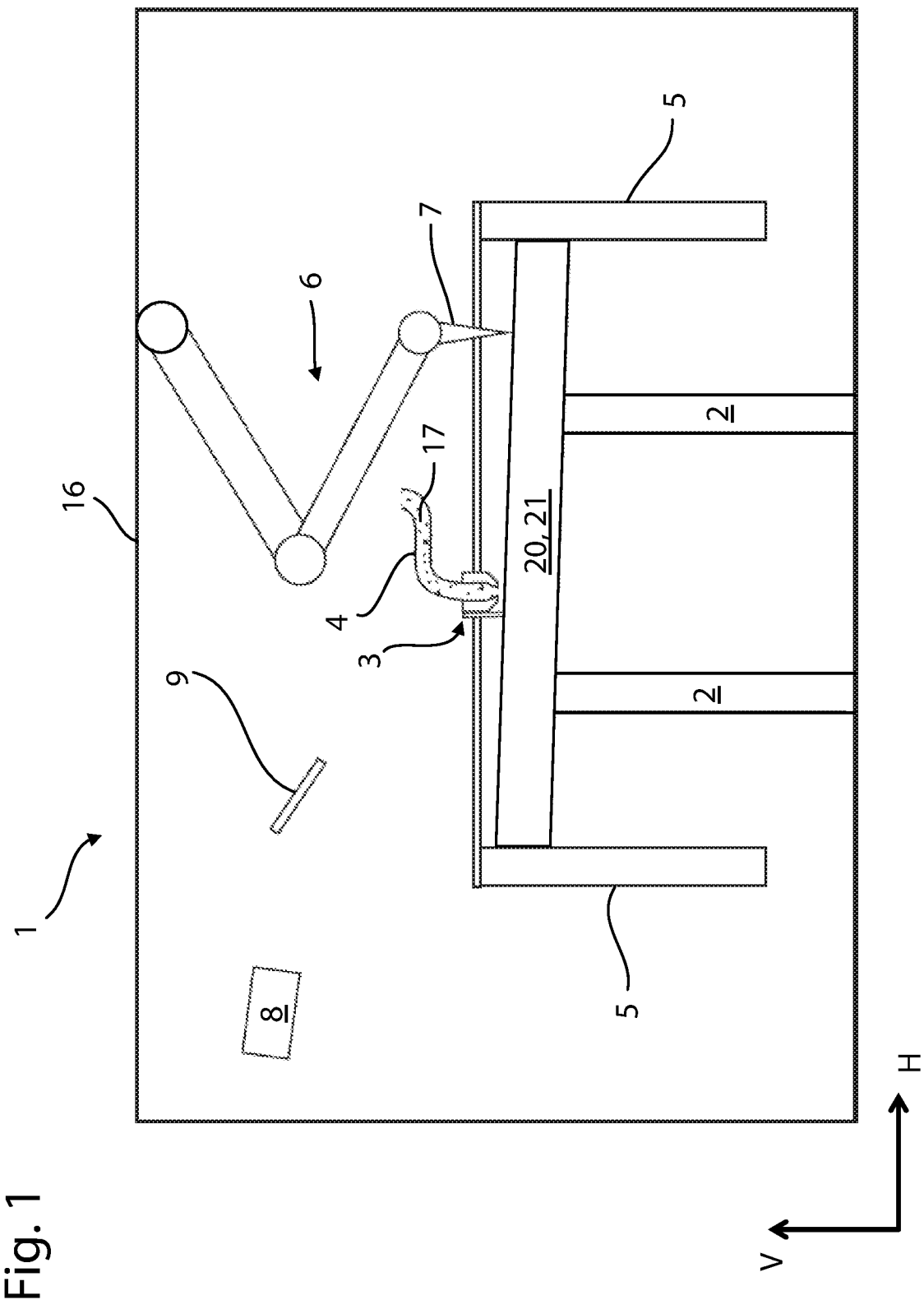
FIG. 1 is a schematic side view of an additive manufacturing system including a robot arm carrying a sensor device measuring a construction platform.

Proper application of the powder 17 requires the buildup surface A extend parallel to the surface of the construction platform 21. If the construction platform 21 is not horizontal H, the buildup surface A is also not horizontal. FIGS. 1-2 show an exaggerated incline of the construction platform 21. A robot articulated arm 6, also referred to as a robotic arm, on which a tactile sensor 7 is arranged on an end thereof, helps recognize such errors. The robot articulated arm 6 is arranged inside the housing 16 and can be pivotably fastened on the housing 16—as schematically indicated. The joints of the robot articulated arm 6 are shown in simplified form and can position the tactile sensor 7 as desired with respect to all six degrees of freedom. FIGS. 1-2 illustrate the tactile sensor 7, guided by the robot articulated arm 6, at two different points on the surface of the construction platform 21; the tactile sensor 7 is located at two different measuring positions. Determining the coordinates of these points determines the vertical alignment of the construction platform 21 and any angle of inclination to the horizontal. Detecting three or more points may determine two angles of inclination. Analysis of the measurement data required for this purpose can be performed by an analysis/control unit, not shown. The control unit controlling support 2 movement in the required direction, based on the established inclination, to return the construction platform to horizontal or level, shown by the arrows in FIG. 3. FIG. 3 also shows the construction platform 21 in a horizontal position, with the robot articulated arm 6 moved into a readiness position, wherein it does not interfere with the movement sequence of the first application device 3.

FIG. 4 illustrates a layer-by-layer application of the metallic powder 17. When the application device 3, connected via a supply line 4 to a storage container (not shown), has applied a layer of powder 17, a part of the powder 17 is selectively melted by a laser beam 10, whereby the powder 17 is bonded to form a matrix 18 producing a layer of an object 19. A laser 8 generates the laser beam 10. The laser beam 10 deflected via a pivotable mirror 9 onto a provided coordinate point inside the buildup surface A. The mirror 9 or scanner system is shown in very simplified form in the figures. An arrangement inside or outside the housing 16 is possible. The laser 8 and mirror 9 operate in a computer-controlled manner according to predefined CAM data of the object 19. The supports 2 lower the construction platform 21 along a transportation direction T, extending parallel to the vertical axis V. The supports 2 operate intermittently; i.e., they are stopped while a powder layer is applied and partially melted, and thereafter transport the construction platform 21 with the object 19 in the transportation direction T from the buildup surface A a distance corresponding to a determined layer thickness. After the layer-by-layer buildup of the object 19 is completed, the loose powder is removed from the construction platform 21, and the finished object 19 is severed and removed.

Figure 5:
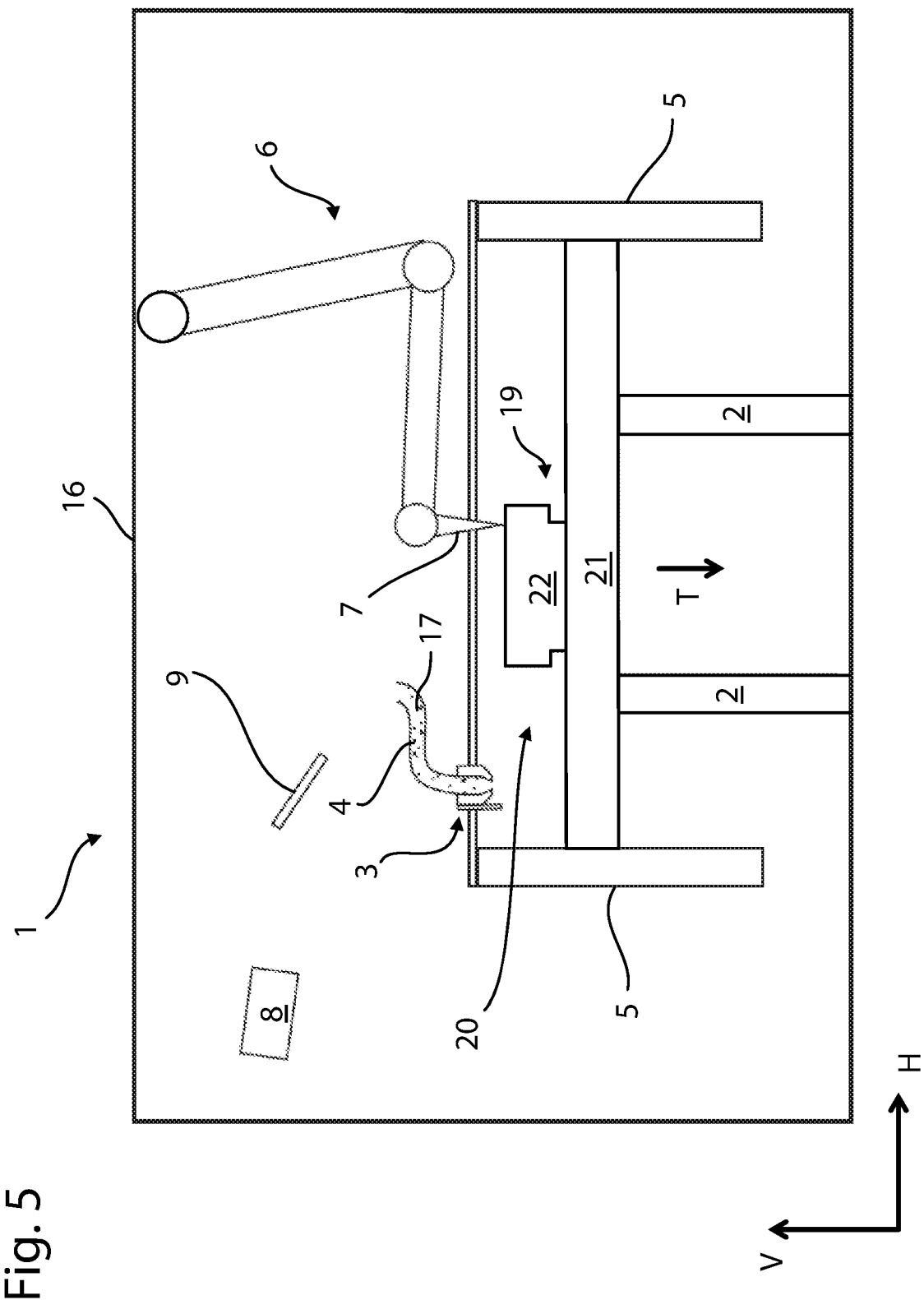
FIG. 5 is a schematic side view of a second embodiment of an additive manufacturing system including a base body on a construction platform.

In the exemplary embodiment in FIGS. 1-4, the buildup takes place on a base 20, formed by the construction platform 21. FIGS. 5-8 illustrate another exemplary embodiment, using a hybrid method including a base body 22. FIG. 5 shows a prefinished base body 22 arranged on the construction platform 21. An additive manufacturing process adds additional material or further structures. Here, the construction platform 21 and the base body 22 jointly form a base 20, onto which the powder 17 is applied. To ensure a proper buildup, the robot articulated arm 6 performs at least one measurement on the base body 22 using the tactile sensor 7 to check the position of the base body 22, as shown in FIG. 5. Normally, a plurality of measurements are performed, to ascertain, for example, the inclination of the base body 22. If the position is to be corrected, the supports 2 are activated. The position of the construction platform 21 can also be checked, as shown in FIGS. 1-2.

Figure 6:
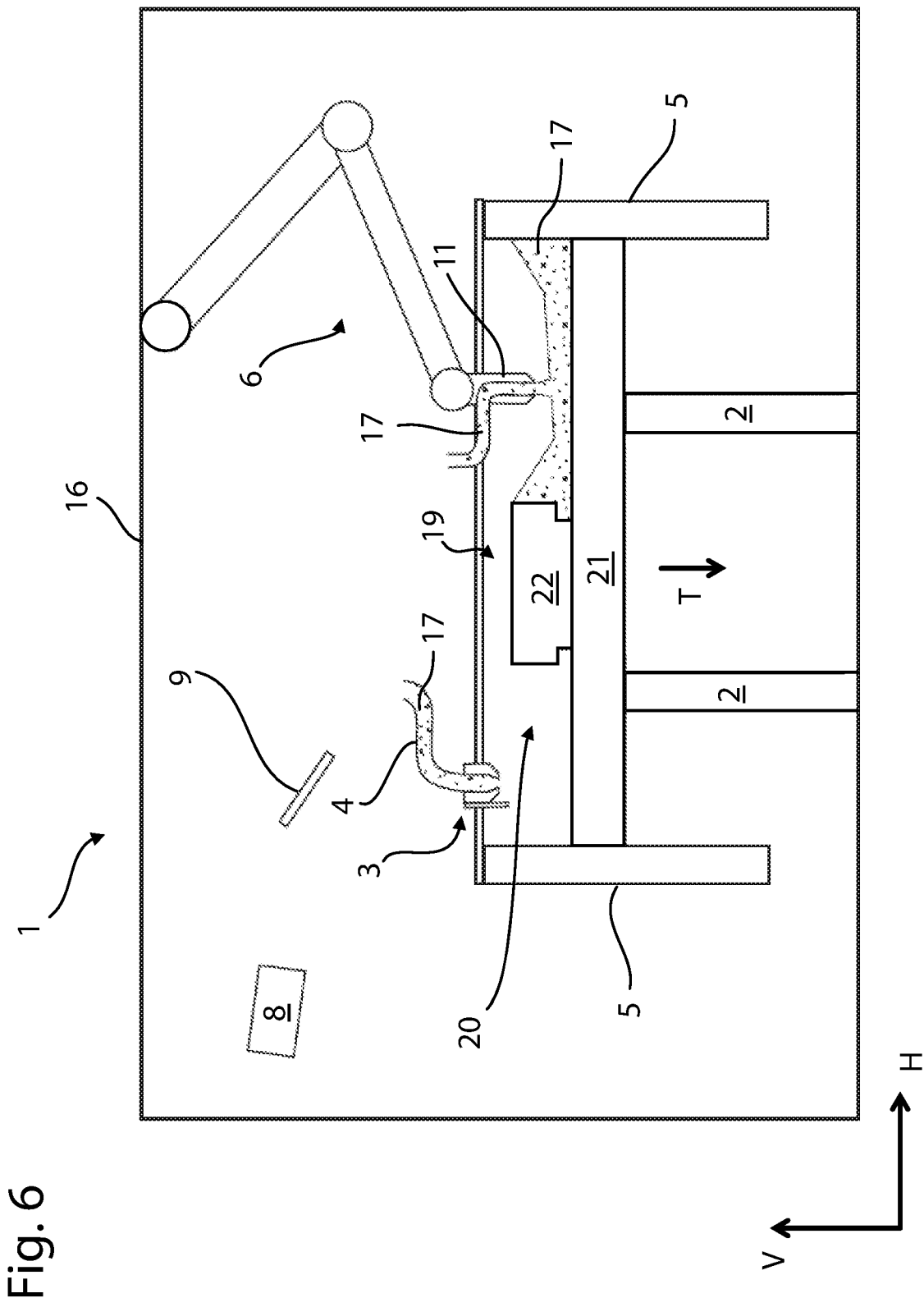
FIG. 6 is a schematic side view of a third embodiment of an additive manufacturing system including a robot arm and secondary application device.

To enable a layer-by-layer application of the metallic powder 17, the regions arranged laterally to the base body 22 have to be filled with powder 17. Use of the first application device 3, designed for applying thin layers along the buildup surface A and moved back and forth in an oscillating manner, is both unsuitable and inefficient. FIG. 6 shows using a second or secondary application device 11, arranged on the end of a robot articulated arm 6, makes the procedure more efficient. The second application device 11, and correspondingly the robot articulated arm 6, guided, for example, intentionally to or even into undercut regions close to the base body 22 to add powder 17. After filling the lateral regions filled with powder 17, further buildup of the object 19 can be performed by fusing the metallic powder 17 to form a matrix 18.

Figure 7:
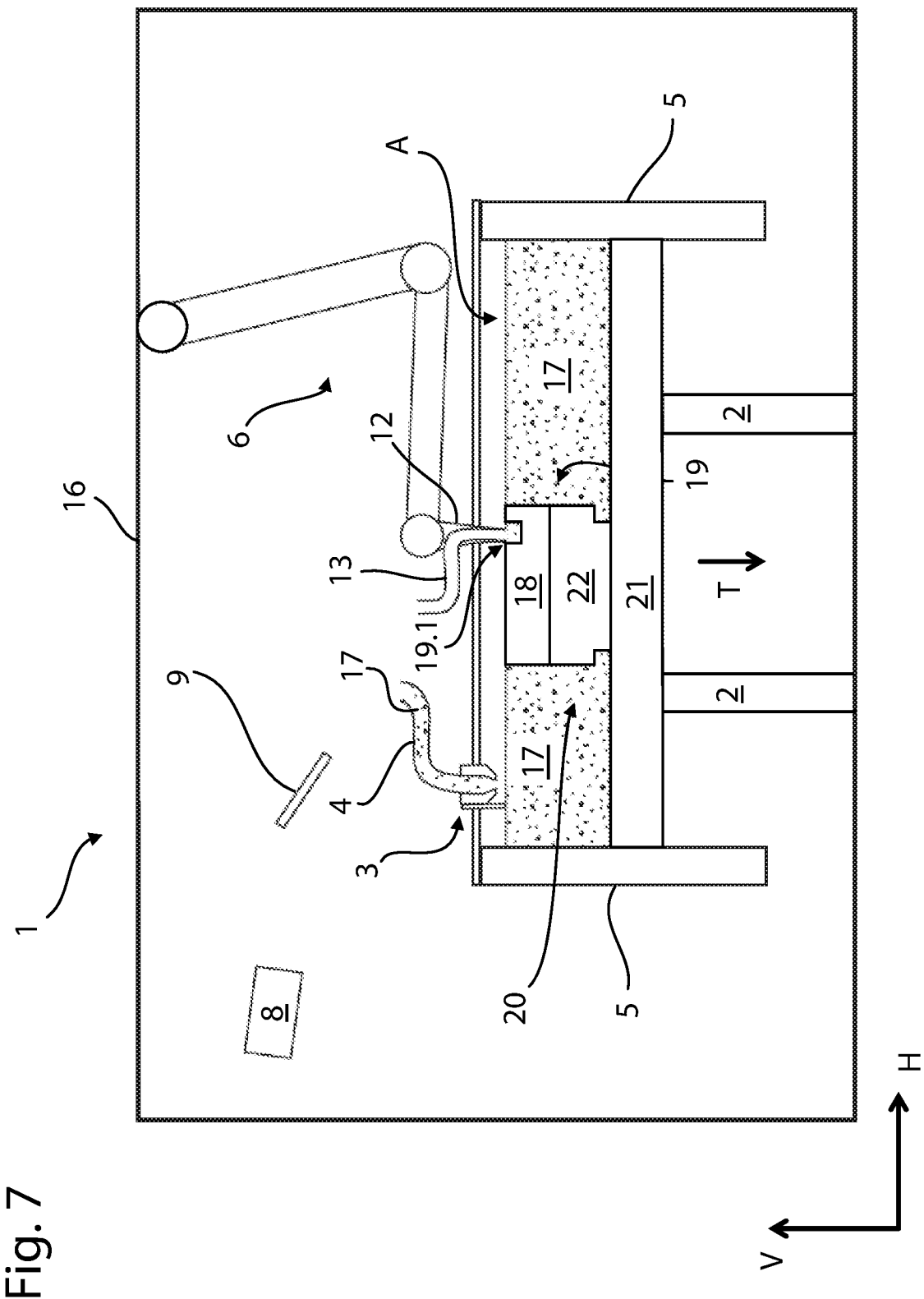
FIG. 7 is a schematic side view of a fourth embodiment of an additive manufacturing system including a robot arm and cleaning device.

FIG. 7 shows a further method step in a later stage of the manufacturing process, wherein a matrix 18 of substantial thickness is built up on the main body 22. An insert part 15, for example, a sensor or the like, typically not additively manufactured, is integrated into the object 19. A recess 19.1, provided for this purpose, includes the powder 17 that is not fused. Before placing the insert part 15 in the recess 19.1, the loose powder 17 must be removed from the recess 19.1. In one embodiment, a suction device 12, used as a cleaning device, the loose powder 17 from the recess 19.1. The suction device 12 arranged on a robot articulated arm 6. A suction line 13 connects the suction device to a partial vacuum source (not shown). The mobility of the robot articulated arm 6, enables the suction device 12 to clean almost any arbitrary region.

Figure 8:
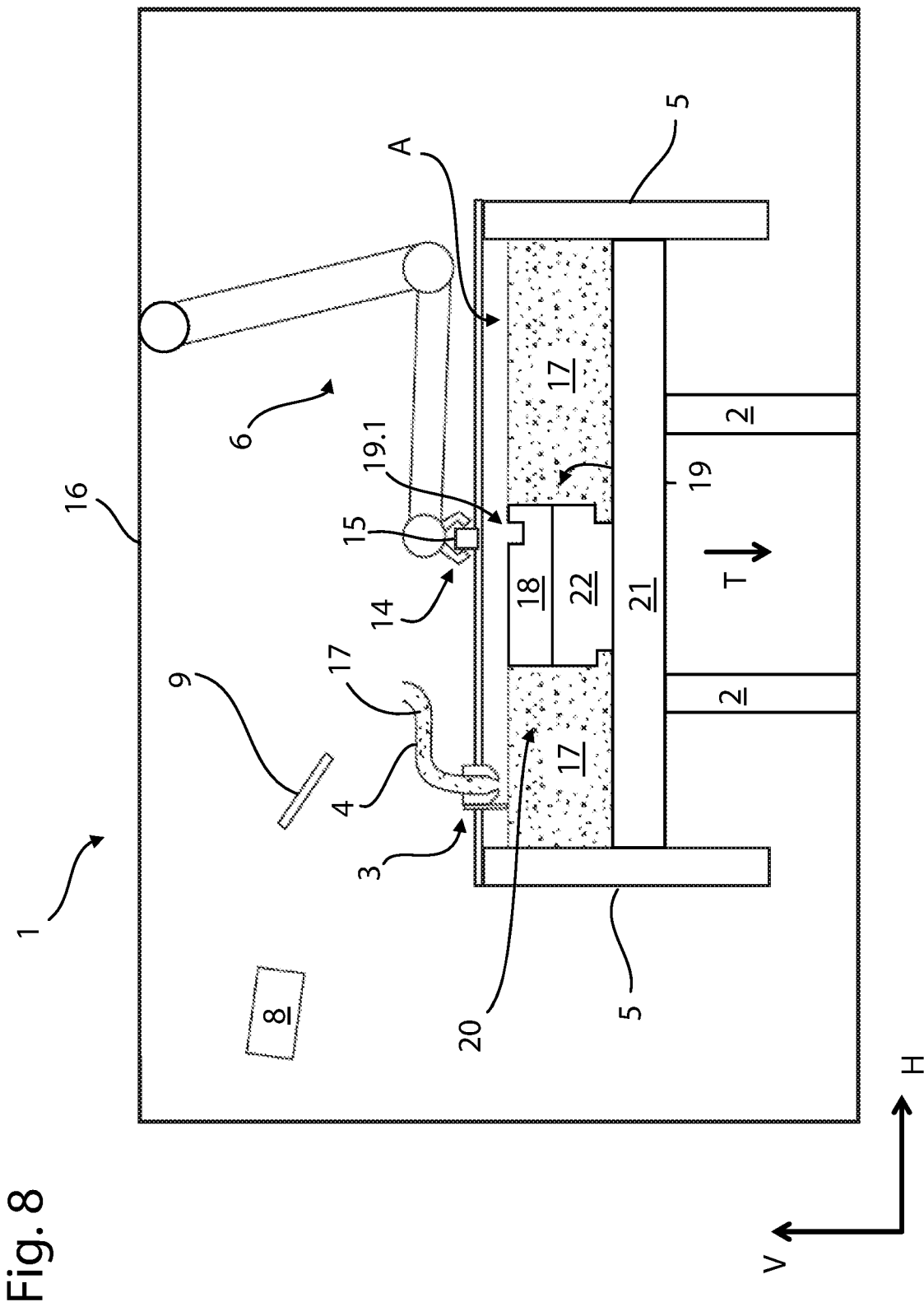
FIG. 8 is a schematic side view of a fifth embodiment of an additive manufacturing system including a robot arm and part holder.

As shown in FIG. 8 after the loose powder 17 is cleaned from the recess 19.1, the insert part 15, made ready for use beforehand, for example in a storage region inside the housing 16, is grasped by a gripper 14 arranged on a robot articulated arm 6, transferred to the recess 19.1, and inserted. The layer-by-layer buildup of the object 19 then continues. During cleaning of the recess 19.1 and also the insertion of the insert part 15, both the application device 3 and also the laser 8 can be temporarily switched off. Under certain circumstances, the steps may be combined with application of the powder 17 and fusing thereof to form the matrix 18, making possible a further time saving.

An additional embodiment includes, an adhesive application device is arranged on the robot articulated arm 6. Before insertion of the insert part 15 into the recess 19.1, the adhesive application device applies an adhesive, the adhesive producing a connection of the insert part to the recess. The adhesive is normally applied in the recess 19.1. However, an application on the insert part 15 is also possible. The adhesive application device normally has a type of nozzle for dispensing the adhesive.

FIGS. 5-8 illustrate different devices 7, 11, 12, 14 couple to or used with the robot articulated arm 6, which is designed identically in each case. The actual design and arrangement of the corresponding elements can deviate from the illustration selected here. For example, multiple robot articulated arms 6 can be provided, each carrying one device 7, 11, 12,

14. Multiple devices 7, 11, 12, 14 may also be permanently arranged on the same robot articulated arm 6. A single robot articulated arm 6 can couple with various devices 7, 11, 12, 14 to use them as needed. The coupling and decoupling of the corresponding devices 7, 11, 12, 14 preferably occurs in an automatic manner inside the housing 16. The preceding also applies to the optional adhesive device.

The additive manufacturing method runs automatically, without manual intervention or opening of the housing 16 being necessary. The method shown operates rapidly and efficiently on the one hand, and opportunity for contamination of the powder 17, in particular, oxidation or even combustion, is reduced.

The additive manufacturing method can be associated with the field of rapid prototyping or rapid manufacturing. However, it is not only suitable for manufacturing prototypes or individual models, but also mass production.

In one embodiment the additive manufacturing method forms an object 19 by applying powder 17 layer-by-layer onto a base 20 along a buildup surface A using an application device 3 and bonding the powder 17 in regions to form a matrix 18. Such a method also called a powder bed method. The powder 17 may include, for example, plastic powder, ceramic powder, or metallic powder. Any powdered or particulate material including at least one metal is called a metallic powder. A metallic powder may also involve an alloy or a mixture of particles of different metals. The powder can also contain semi-metals or nonmetals, for example as a component of an alloy. Aluminum, titanium, and iron are considered as metals.

The application device 3 applies one layer of powder 17 at a time along a buildup surface A. The layer thickness can be, for example, between 10 µm and 500 µm. Other layer thicknesses are also conceivable. The application device 3 may have one or more dispensing openings, from which the powder exits, following gravity, for example. The application device 3, including the dispensing openings thereof, typically moves back and forth in an oscillating manner along the buildup surface A. The application device 3 may include a smoothing device, for example, a squeegee, brush, or blade, is moved parallel to the buildup surface that smooths the surface of the powder enabling a smooth and uniform layer buildup. The buildup surface A is planar and may be called a buildup plane. Application of the powder 17 occurs in a layer-by-layer arrangement on the base 20; i.e., the first layer is applied directly to the base 20, after which the further layers are successively applied one over another.

After a layer of the powder 17 has been applied, or at least a part thereof, the powder 17 is bonded in regions to form a matrix 18. The bonding can take place for this purpose, for example, by selective application of a binder. The binder is normally liquid and when applied solidifies and cures. In this way, the powder particles bind to one another in the corresponding region and form the matrix with the binder. However, sintering or melting of the powder particles can also be performed. Corresponding methods are known, for example, selective laser sintering (SLS), selective electron-beam melting (SEBM), or selective laser melting (SLM).

With selective laser melting, after applying a respective layer, the powder 17 is melted in regions by a laser beam and solidifies forming a coherent solid from the powder, which represents the matrix 18. The powder of the last-added layer is fused with the solid structures of the underlying layer or multiple underlying layers, whereby a cohesion of the layers with one another is produced. Depending on the layer thickness the laser beam melts the material up to a depth that corresponds to multiple layer thicknesses.

The laser beam normally acts in a specific pattern; a predetermined area is irradiated. It is possible, for example, that scanning of the area by a tightly focused laser beam takes place, or that a specific radiation pattern is projected all at once. Various scanning patterns are possible, for example, the contour of an area can be traveled first and then the interior thereof or vice versa. The alignment of the laser beam with respect to the buildup surface is generally performed not by moving a laser itself, but rather by a beam generated by the laser being deflected by at least one movable mirror. The spatial and chronological radiation pattern of the laser beam can be controlled with predefined data, for example, CAM data, of an object to be produced. The irradiated area corresponds to a generally planar cross-section of the object. Such a method may also be called "build-up welding." In electron-beam melting, an electron beam is used instead of the laser beam to melt the powder particles. In selective laser sintering, a smaller amount of energy is introduced by the laser beam, and therefore the powder particles are not completely melted, but only sintered.

The base 20 typically has a buildup or construction platform 21, which generally has a planar surface on which the first powder layer is applied. Side walls 5 are arranged laterally to the construction platform 21 are used to prevent uncontrolled trickling off of powder 17. The base 20 may have a base body 22, arranged and/or fixed on the construction platform 21 and provided for forming a part of the finished object 19; i.e., the matrix 18 is created at least partially, indirectly on the base body 22, wherein typically a material bond and/or form fit forms. Here, a hybrid method, in which, for example, a "conventional" production method for producing the base body can be combined with an additive manufacturing method. The base body 22 could also have been produced beforehand by an additive manufacturing method.

During the layer-by-layer application, melting, and solidification, the base 20 with the object 19 is normally advanced in a transportation direction of the buildup surface A. The transportation direction extending at an angle to the buildup surface A, typically perpendicularly to the buildup surface A. In a typical buildup, the buildup surface A extends horizontally, at a right angle to the direction of gravity, and the transportation direction extends vertically. During the manufacturing procedure, the base is successively lowered, specifically by a single layer thickness for each layer applied by the application device 3. The transportation normally takes place intermittently; i.e., discontinuously, wherein one layer is applied while the base 20 is stationary, and the base 20 with the object, transported, corresponding to one layer thickness, only when the layer has been completely applied. The action of the laser beam or electron beam, or applying a binder, normally takes place with the base body 22 is at rest. However, continuous transportation is theoretically conceivable, wherein the movement of the application device and the control of the laser beam, etc. adapt to the movement of the base 20. The described layer-by-layer construction and transportation of the base body 22 with the object 19 continues until the object is completed; for example, the object 19 corresponds to CAM data on which it is based.

It would be possible to keep the base 20 stationary while the application device 3 moves away from the buildup surface A. For example, after applying one layer, the application device 3 moves. Continuous transportation of the application device is also possible as an alternative to intermittent transportation of the application device 3.

In an exemplary embodiment of a sensor device 7 measures the distance to the base and provides a measured position of the base 20. Depending on the measurement the position is automatically corrected, at least in relation to the application device 3. The sensor device 7 measures the position of the base and based on the measured position the method checks the position of the base 20. The sensor device 7 can be arranged in a stationary or movable manner, and therefore moved to a predetermined measuring position for the respective measurement. The measurement is typically taken to the base 20; however, it would also be possible to carry out the measurement on another element, from which the position of the base may be inferred. A plurality of measurements can also be carried out. For example, position measurements could be carried out spatially continuously to a certain extent, so a surface is scanned. However, a plurality of discrete position measurements could be performed at different points.

The measurement checks the base 20 position; i.e., an actual value is compared to a setpoint value. If a deviation exists or if the deviation exceeds a predefined threshold value, automatic correction is performed, wherein the base 20 position is at least approximated to the setpoint value and ideally is set to the setpoint value. The measurement recognizes and remedies a misalignment of the base 20, which could impair the manufacturing process with respect to quality. A possible consequence of a misalignment includes, for example, incorrect application of the powder 17 layers in relation to the base 20. Correct application of the first layer is crucial for proper manufacturing, for example, to ensure correct bonding on the base. The important position of the base is its relation to the application device 3. The correction performed at least in relation to the application device 3, which includes the option of repositioning the application device 3 with respect to the absolute position of the base. However, a correction of the absolute position of the base 20 may more easily be implemented. In the disclosed embodiment, correction of the base 20 position takes place automatically; no manual intervention is necessary. Automatic correction has an advantageous effect on the process time, and reduces, potential possible contamination of the manufacturing region due to manual intervention.

At least one measurement is carried out before applying the first powder layer. It is also possible, or optional, to carry out at least one measurement during manufacturing the workpiece.

The sensor device 7 is preferably arranged on a robot articulated arm 6, moving the sensor device 7 into a measuring position for the respective measurement. The robot articulated arm 6 carries the sensor device 7 normally arranged on an end on the robot articulated arm 6. The robot articulated arm 6 including a plurality of articulated arm segments, a first arm segment can be articulated with a stationary installed base and the sensor device 7 articulated with a second arm segment. The robot articulated arm 6 positioning the sensor device 7 with respect to a three-dimensional position and three rotational angles. In this manner, the robot articulated arm 6 moves the sensor device 7 to an optimum measuring position to the base 20 for a measurement. After the measurement, the sensor device 7 can either be moved into a further measuring position for a further measurement or to a position which can be referred to, for example, as a readiness position. The readiness position being a position wherein neither the robot articulated arm 6 nor the sensor device 7 interferes with the operation of the application device 3.

There are no restrictions regarding the type and design of the sensor device 7. The position of the base 20 may be determined in a contactless manner with sound waves or electromagnetic waves or by analyzing the runtime of a signal emitted by the sensor device and reflected from the object to be measured. The sensor device 7 provides a measured position of the base 20. The accuracy of the measurement should be in the order of magnitude of layer thickness, for example, between 10 µm and 500 µm. Such accuracies cannot be achieved or can only be achieved with great effort via runtime measurements, at least with sound waves. The measurement could be based on triangulation; for example, a camera arranged offset to the laser registers the point of incidence of a laser beam emitted toward the object. Moving the sensor device 7 into an optimum measuring position, for example, close to or adjacent the base 20, with the robot articulated arm 6 reduces measuring errors. However, at least one measurement is particularly preferably carried out by touch using a sensor device 7 designed as a tactile sensor. A corresponding touch measurement carried out in an optimum manner using the robot articulated arm 6. For example, the sensor device 7 includes a tactile sensor guided to the object to be measured, normally the base, by the robot articulated arm 6 until physical contact is established. Using the robot articulated arm 6 and sensor device 7 one or more points are measured, and the three-dimensional coordinates thereof can be determined. The position of the base 20 is, in turn, derived therefrom.

The position of the base 20 is generally given by 6 degrees of freedom, namely 3 degrees of freedom of translation and 3 degrees of freedom of rotation. In one example, the height or vertical position of the base can be ascertained by a single measurement and corrected if needed. If necessary, the horizontal position could also be corrected. If an unintended inclination of the base 20 exists, which would have a disadvantageous effect on the manufacturing process, at least one angle of inclination of the base 20 is automatically corrected depending on the at least one measurement. Because at least two measurements are needed to determine an angle of inclination the sensor device 7, including the tactile sensor, could be guided to two different points of the surface of a construction platform 21, wherein a deviation of the vertical positions would indicate an inclination of the construction platform 21. An angle of inclination would exist to the horizontal H, which could be reduced or remedied by suitable actuators connected to the base 20. For example, two angles of inclination in different directions could be determined by three, or more, single measurements.

Another exemplary embodiment includes manufacturing of the object in an inert gas atmosphere, normally necessary with the use of metallic powders, since they could oxidize, combust, or even explode in ambient air. The method is at least partially carried out in a housing, that partially, normally completely, encloses the base 20, the application device 3, and the robot articulated arm 6. The term "inert gas atmosphere" refers to an atmosphere that contains reactive gases such as oxygen to a limited extent, but is enriched with inert gas compared to normal air. Because the measurements and any corresponding corrections to the base 20 are carried out automatically manual intervention in the manufacturing region is unnecessary before and during the actual manufacturing. The inert gas atmosphere remains stable, wherein normally a certain supply of inert gas is necessary for this purpose, for example, because of leaks, which are difficult to avoid, or because of the necessity of suctioning out smoke created by the effect of the laser.

The base 20 normally has a construction platform 21. In an embodiment of the method, at least one measurement is carried out on the construction platform 21, from which the object 19 is removed after it is finished. For example, one surface of the construction platform 21 can be measured in a contactless manner or, by a sensor device 7 including a tactile sensor. The tactile sensor guided by the robot articulated arm 6 until it touches one or more points of the surface of the construction platform 21, from which the vertical position of the construction platform 21 and one or more angles of inclination can be determined.

A further embodiment includes at least one measurement taken at a prefinished base body 22 arranged on the construction platform 21, which remains connected to the matrix as part of the finished object 19. In one example, the base body 22 is manufactured, for example, conventionally or by an upstream additive manufacturing method, wherein further structures are added to the base body by the manufacturing method. If the position of the base body 22 deviates from a setpoint value, this can be corrected by a position correction of the base body 22 to the construction platform 21, or by a change of the position of the construction platform 21, on which the base body is positioned. Under certain circumstances, the position of the construction platform 21 to be corrected can also be inferred by way of a measurement on the base body 20 or vice versa.

If a base body 22 is provided on the construction platform 21, it is generally not possible to build up the powder bed exclusively on the base body 22. Rather, the base body 22 is typically embedded in the powder, the regions adjacent to the base body 22 have to be filled with powder. Filling these regions can be difficult or impossible for an oscillating application device 3 because the oscillating application device 3 is designed to apply a closed, planar powder layer. In one embodiment, powder is applied on the construction platform 21 adjacent to the base body 22 by a secondary application device 11 arranged on the robot articulated arm 6. The secondary application device 11 may include, for example, a nozzle arranged on the end of the robot articulated arm 6, which is connected to a line, via which the powder 17 is supplied. The high level of mobility of the robot articulated arm 6, even with a complicated design of the base body 22, enables filling the regions adjacent to the base body 22 with powder, even if undercuts are present. "Adjacent to the base body" means the region arranged inside a plane extending through the base body and parallel to the buildup surface. The secondary application device 11 arranged on the robot articulated arm 6 can be used for the purpose described here, while the actual buildup of closed powder layers is carried out by a primary application device 3. However, the single application device could also manage this.

One or more additional manufacturing processes may also be used, depending on the manufactured object 19. For example, components may be added to the object 19, which may not be manufactured in the course of the additive manufacturing in the powder bed method. These parts can be, for example, sensors, magnets, fastening elements, other components, or parts. In a typical design, such a component or part can be arranged in a recess formed inside the matrix and fixed therein, for example, by a form fit. Such a part can also be called an "insert" or "insert part." In one embodiment, a recess for accommodating an insert part 15 is created inside the object by unbonded powder, powder not being bonded in a region provided for the recess 19.1. The unbonded powder is subsequently removed by a suction device 13 arranged on a robot articulated arm 6. For example, during manufacturing of the object 19, the unbonded powder 17 is not fused, melted, cured, or otherwise bonded to form the matrix 18 in a region in which the recess 19.1 is formed, but is still present as loose material or powder. The region has to be at least partially enclosed by regions in which the powder is bonded to form the matrix. To provide space for the insert part 15, the unbonded or loose powder has to be removed. However, for an optimum form fit of the insert part 15 with the surrounding matrix 18, the insert part 15 should be inserted into the recess 19.1 during the additive manufacturing. This requires that the recess 19.1 be cleaned, that is free of loose powder deposited during the additive manufacturing process. In the described embodiment a cleaning device is arranged on a robot articulated arm 6. The cleaning device could be, for example, a suction or blowing device, which suctions the loose powder using a partial vacuum or blows out the powder using a gas flow. The cleaning device could also have mechanical means for removing the powder, for example, bristles or the like, which are moved in a rotating or oscillating manner. Control of the robot articulated arm 6 and the cleaning device preferably takes place automatically wherein the recess can be cleaned and prepared for the insertion of the insert part, without external, in particular manual, intervention being necessary. If an excessively large amount of powder was removed, for example from adjoining regions, powder could be supplemented with an application device arranged on a robot articulated arm 6, as described above.

In one embodiment, before the insertion of the insert part 15 into the recess 19.1, an adhesive for bonding the insert part 15 to the recess 19.1 is applied by an adhesive device, connected to or arranged on a robot articulated arm 6. The adhesive connecting the insert part 15 to the recess 19.1 can be applied to the insert part 15 and in the recess 19.1. The adhesive device normally has a type of nozzle for dispensing the adhesive.

If the insert part 15 is to be accommodated in a formfitting manner in the recess 19.1 and the matrix 18 is to be produced more or less around the insert part 15, it is preferable for the insertion of the insert part 15 to take place without external intervention in the production process. Preferably, the robot articulated arm 6, and corresponding insert part holder, inserts the insert part 15 into the recess 19.1. For example, the robot articulated arm 6 grasps the insert part 15, provided for example in a storage region, with the insert part holder, transfers it to the recess 19.1, and inserts it. The insert part holder, or other holding device, can be a gripper, a switchable magnet, or other mechanism to grasp the insert part 15 configured based on the insert part shape or configuration.

References to the "robot articulated arm" or "robotic arm" in conjunction with the application device, the cleaning device, and the holding device along with statements made in conjunction with the sensor device may apply to each other. For example, the respective robot articulated arm 6 can be designed in an identical or similar manner. If multiple devices are used, a separate robot articulated arm 6 can be used for each device. Each additional manufacturing process may require an additional device and may include one or a plurality of devices, selected from the sensor device, the secondary application device, the cleaning device, the holding device, and the adhesive device can be guided by the same robot articulated arm 6. In one embodiment at least two devices are permanently arranged on the robot articulated arm 6 wherein each respective device is fixedly installed and therefore its position on the robot articulated arm 6 is readily determinable with high accuracy. In an illustrative example, the sensor device 7 is permanently installed on the robot articulated arm 6, since a slight misalignment could influence the measurement results in a relevant manner. In another example, at least two devices can be coupled on the robot articulated arm 6. The devices form quasi-modules, which can be used as needed. The robot articulated arm 6 is able to automatically couple and decouple the modules. Here, the end of the robot articulated arm can be comparatively light, since only one device has to be guided at a time. In addition, the problem does not exist that the devices could obstruct one another or impair their respective functions.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An additive manufacturing method, wherein an object is manufactured by powder being applied layer-by-layer by a powder applicator onto a base along a buildup surface and being bonded in a predetermined area to form a matrix comprising:
    a position of the base is checked by at least one measurement by a sensor and the position is automatically corrected at least in relation to the power applicator depending on the at least one measurement; and
    the sensor is arranged on a robot articulated arm by which it is moved into a measuring position for the respective measurement wherein the robot articulated arm, and corresponding the sensor, is separate from and operates independently of the powder applicator.

2. The additive manufacturing method of claim 1 wherein at least one measurement is carried out by touch with the sensor including a tactile sensor.

3. The additive manufacturing method of claim 2 wherein at least one angle of inclination of the base is automatically corrected depending on the at least one measurement.

4. The additive manufacturing method of claim 1 wherein manufacturing the object is carried out in an inert gas atmosphere.

5. The additive manufacturing method of claim 1 wherein at least one measurement is carried out on one of a construction platform from which the object is removed after it is finished and a prefinished base body arranged on the construction platform that remains connected to the matrix as part of the object.

6. The additive manufacturing method of claim 1 wherein a recess is created inside the object to accommodate an insert part by powder not being bonded in a region provided for the recess with any unbonded powder being removed by a cleaning device arranged on the robot articulated arm.

7. The additive manufacturing method of claim 1 wherein an insert part is inserted into a recess by the robot articulated arm on which an insert part holder is arranged.

8. The additive manufacturing method of claim 1 wherein at least two devices, selected from the sensor, a secondary application device, a cleaning device, and an insert part holder are guided by the robot articulated arm.

9. An additive manufacturing method comprising:
    using a powder applicator to apply a powder layer-by-layer onto a base along a buildup surface;
    bonding the powder in a predetermined area to form a matrix producing a layer of an object;
    providing a robotic arm separate from and operating independently of the powder applicator, the robotic arm carrying a sensor; and
    using the robotic arm to position the sensor at a plurality of measuring positions and using the sensor to measure a position of the base;
    comparing the measured position of the base to a setpoint value;
    correcting the position of the base in relation to the application device based on the measured position of the base when the measured position of the base deviates from the setpoint value; and
    using the robotic arm to perform an additional manufacturing process.

10. The method of claim 9 including the base having a construction platform and using the sensor to measure a position of the construction platform; and
    instead of correcting the position of the base in relation to the application device correcting the position of the construction platform relative to the application device.

11. The method of claim 9 wherein the sensor includes a tactile sensor.

12. The method of claim 9 including positioning the robotic arm in a readiness position spaced from the powder applicator wherein neither the robotic arm nor the sensor moves with the powder applicator.

13. The method of claim 9 including performing the step of bonding the powder in an inert gas atmosphere.

14. The method of claim 9 including a second powder applicator, the second powder applicator applying powder on a construction platform adjacent to a base body; and
    the robotic arm carrying and positioning the second powder applicator.

15. The method of claim 9 including the robotic arm carrying an insert part and inserting said insert part into a recess in the object.

16. The method of claim 9 including a cleaning device for removing unbonded powder; and
    the robotic arm carrying and positioning the cleaning device.

17. The method of claim 9 including at least two devices selected from the sensor, a second powder applicator, a cleaning device, and an insert part holder are carried and positioned by the robotic arm.

18. An additive manufacturing method comprising:
    using a powder applicator to apply a powder layer-by-layer onto a base along a buildup surface;
    bonding the powder in a predetermined area to form a matrix producing a layer of an object;
    providing a robotic arm separate from and operating independently of the powder applicator, the robotic arm carrying a sensor, using the sensor to measure a position of the base;
    comparing the measured position of the base to a setpoint value; and
    correcting the position of the base in relation to the powder applicator based on the measured position of the base when the measured position of the base deviates from the setpoint value.

19. The additive manufacturing method of claim 18 wherein the sensor includes a tactile sensor.

20. The additive manufacturing method of claim 18 including positioning the robotic arm in a readiness position spaced from the powder applicator wherein neither the robotic arm nor the sensor moves with the powder applicator.

* * * * *